US006985605B2

(12) United States Patent
Ueki et al.

(10) Patent No.: US 6,985,605 B2
(45) Date of Patent: Jan. 10, 2006

(54) PHASE UNWRAPPING METHOD FOR FRINGE IMAGE ANALYSIS

(75) Inventors: Nobuaki Ueki, Saitama (JP); Katsuyo Kubo, Saitama (JP)

(73) Assignee: Fujinon Corporation, Saitama (JP)

( * ) Notice: Subject to any disclaimer, the term of this patent is extended or adjusted under 35 U.S.C. 154(b) by 560 days.

(21) Appl. No.: 10/196,426

(22) Filed: Jul. 17, 2002

(65) Prior Publication Data

US 2003/0035566 A1 Feb. 20, 2003

(30) Foreign Application Priority Data

Jul. 27, 2001 (JP) .............................. 2001-227990

(51) Int. Cl.
 *G06K 9/00* (2006.01)
 *G01B 11/02* (2006.01)
(52) U.S. Cl. ..................................... 382/108; 356/512
(58) Field of Classification Search ................ 382/108, 382/286, 298, 305; 356/450, 497, 504, 511, 356/512, 603, 605, 618; 702/159
See application file for complete search history.

(56) References Cited

U.S. PATENT DOCUMENTS

| | | | | |
|---|---|---|---|---|
| 6,421,629 B1 * | 7/2002 | Ishiyama | ..................... | 702/159 |
| 6,621,579 B2 * | 9/2003 | Ge | .............................. | 356/512 |
| 6,639,685 B1 * | 10/2003 | Gu et al. | ..................... | 356/603 |
| 6,744,517 B1 * | 6/2004 | Forno et al. | ................. | 356/450 |

OTHER PUBLICATIONS

Extended Abstracts (The 55th Autumn Meeting, 1994); The Japan Society of Applied Physics, Sep. 1994, p. 803.

* cited by examiner

*Primary Examiner*—Kanjibhai Patel
(74) *Attorney, Agent, or Firm*—Snider & Associates; Ronald R. Snider

(57) ABSTRACT

In a phase unwrapping method for fringe image analysis, when storing newly calculated numeric data into a storage list, the new numeric data is initially compared with numeric data of a representative rank within each rank block in the storage list, whereby the rank block to store the data is chosen. Subsequently, the new numeric data is compared with each of respective numeric data within thus chosen rank block, so as to determine a rank at which the new numeric data is to be stored, and then is stored into the storage list. Along with the storing of numeric data, rank data is updated.

4 Claims, 3 Drawing Sheets

PHASE UNWRAPPING METHOD FOR FRINGE IMAGE ANALYSIS

RELATED APPLICATIONS

This application claims the priority of Japanese Patent Application No. 2001-227990 filed on Jul. 27, 2001, which is incorporated herein by reference.

BACKGROUND OF THE INVENTION

1. Field of the Invention

The present invention relates to a phase unwrapping method for a wrapped phase distribution obtained on a predetermined coordinate system in a fringe image analysis method for analyzing and measuring wavefront information concerning physical properties of a sample such as its form, thickness deviations, and refractive index distribution by using interference fringes, moiré fringes, or the like. In particular, the present invention relates to a technique for determining an unwrapping path on the coordinate system.

2. Description of the Prior Art

Various techniques have conventionally been known for measuring the surface form of a sample and the like with a high accuracy by analyzing fringe image signals of interference fringes, moiré fringes, and the like which are phase-modulated spatially or temporally. How to obtain accurate phase information from fringe image signals is a basic problem common in this kind of analysis techniques.

For example, in the heterodyne interference using Fourier transform, phase values obtained on a coordinate system corresponding to pixels on an imaging device are folded into a principal value range of $[-\pi, \pi]$ (phase wrapping), whereby phase values become discontinuous for phases having a large dynamic range and exhibit indefinite values of integral multiples of $2\pi$. Therefore, in order to attain a phase distribution in conformity to an actual surface form, phase unwrapping is necessary for determining the original continuous phase distribution from the phase distribution $\Phi(x, y)$ thus folded in the principal value range of $[-\pi, \pi]$.

When carrying out such phase unwrapping, a highly accurate continuous phase distribution $\Phi'(x, y)$ can be determined even with a simple algorithm for smooth phase distributions yielding less noise, since the results of processing are not influenced by unwrapping paths (routes along with the phase unwrapping is carried out). When signals include a region yielding a large amount of noise and a low modulation (amount depending on interference fringe amplitude), results of processing totally differ from each other depending on unwrapping paths, which makes it necessary to choose an unwrapping path rationally on the coordinate system in order to determine the highly accurate continuous phase distribution $\Phi'(x, y)$.

Under such circumstances, techniques adapted to choose an unwrapping path rationally and carry out phase unwrapping favorably even when noise is high or modulation is low have recently been proposed.

Such a technique is a method in which portions yielding a higher contrast (higher modulation) in interference fringes are taken into account, unwrapping paths deemed to be the most rational are chosen successively from such portions, and phase unwrapping is carried out along thus chosen unwrapping paths. For choosing the most rational unwrapping paths, a graph problem known as minimum spanning tree problem in the field of computer science is adopted. Among such techniques, one known as amplitude maximum tree method has been known to be effective (see Proceedings of the 55th Annual Meeting of the Japan Society of Applied Physics (1994)).

In the amplitude maximum tree method, in the process of choosing unwrapping paths, it is necessary to successively carry out processing operations in which individual pixels on the unwrapping paths chosen heretofore and their adjacent pixels are multiplied by their respective recorded amplitudes so as to yield their products, thus determined individual products are stored in a memory of a computer and the like, those yielding the maximum value are chosen from these products, and a path between their corresponding pixels is taken as a new unwrapping path.

Recently, the number of pixels in imaging devices has been prone to increase dramatically, thereby enhancing demands for carrying out analysis with a higher accuracy by using fringe images having a greater number of pixels. To this aim, it is necessary that the processing speed of phase unwrapping be enhanced.

However, conventional phase unwrapping methods such as the amplitude maximum tree method use an algorithm in which the processing time increases as the number of pixels is greater so that the number of calculated values to be stored increases, whereby the processing time of phase unwrapping increases substantially in proportion to the increase in the number of pixels, which may be problematic in that it takes an enormous time for analyzing the phase state of fringe images.

SUMMARY OF THE INVENTION

In view of such circumstances, it is an object of the present invention to provide a phase unwrapping method for fringe image analysis which can rapidly carry out phase unwrapping even when the number of pixels of an imaging device increases, and can stably analyze phase states at a high speed.

For achieving the above-mentioned object, the present invention provides a phase unwrapping method for fringe image analysis in which a wrapped phase distribution concerning a sample obtained on a predetermined coordinate system according to fringe image data carrying wavefront information of the sample is subjected to unwrapping along a predetermined unwrapping path chosen on the coordinate system, so as to obtain an unwrapped phase distribution, the method comprising a first step of ranking and storing as a scale for choosing the unwrapping path in a predetermined storage list from an upper rank to a lower rank in the order of size suitable for path selection a predetermined number of numeric data successively calculated so as to respectively correspond to individual paths connecting predetermined pixels adjacent each other on the coordinate system, and a second step of taking out the numeric data at the highest rank in all the numeric data stored in the storage list and choosing the path corresponding to thus taken-out numeric data as a new unwrapping path; wherein the storage of numeric data in the first step comprises a block choosing step of choosing a rank block to store the new numeric data by comparing in terms of magnitude new numeric data to be stored in the storage list with the numeric data at a predetermined representative rank in each of rank blocks for each predetermined rank range in the storage list, and a rank position choosing step of comparing in terms of magnitude the new numeric data with each numeric data in thus chosen rank block so as to determine a rank position at which the new numeric data is to be stored; and wherein the predetermined rank range is updated together with the storage of the numeric data in the first step.

The above-mentioned "ranking" refers to the defining of the order of "numeric data". Though each numeric data may be provided with its rank, it is not necessary to do so if an order can be defined.

As the above-mentioned numeric data, a modulation product of the pixels adjacent each other may be used, whereas the numeric data at the highest rank can be the largest of all the modulation products stored.

When the numeric data is calculated in the first step, thus calculated numeric data may be stored in the storage list only if the calculated numeric data is a value more suitable for path selection than a predetermined value.

The unwrapping may be carried out while applying an algorithm including the first and second steps only to a region yielding a large amount of noise in the wrapped phase distribution in the coordinate system.

DESCRIPTION OF THE PREFERRED EMBODIMENTS

Figure 1:
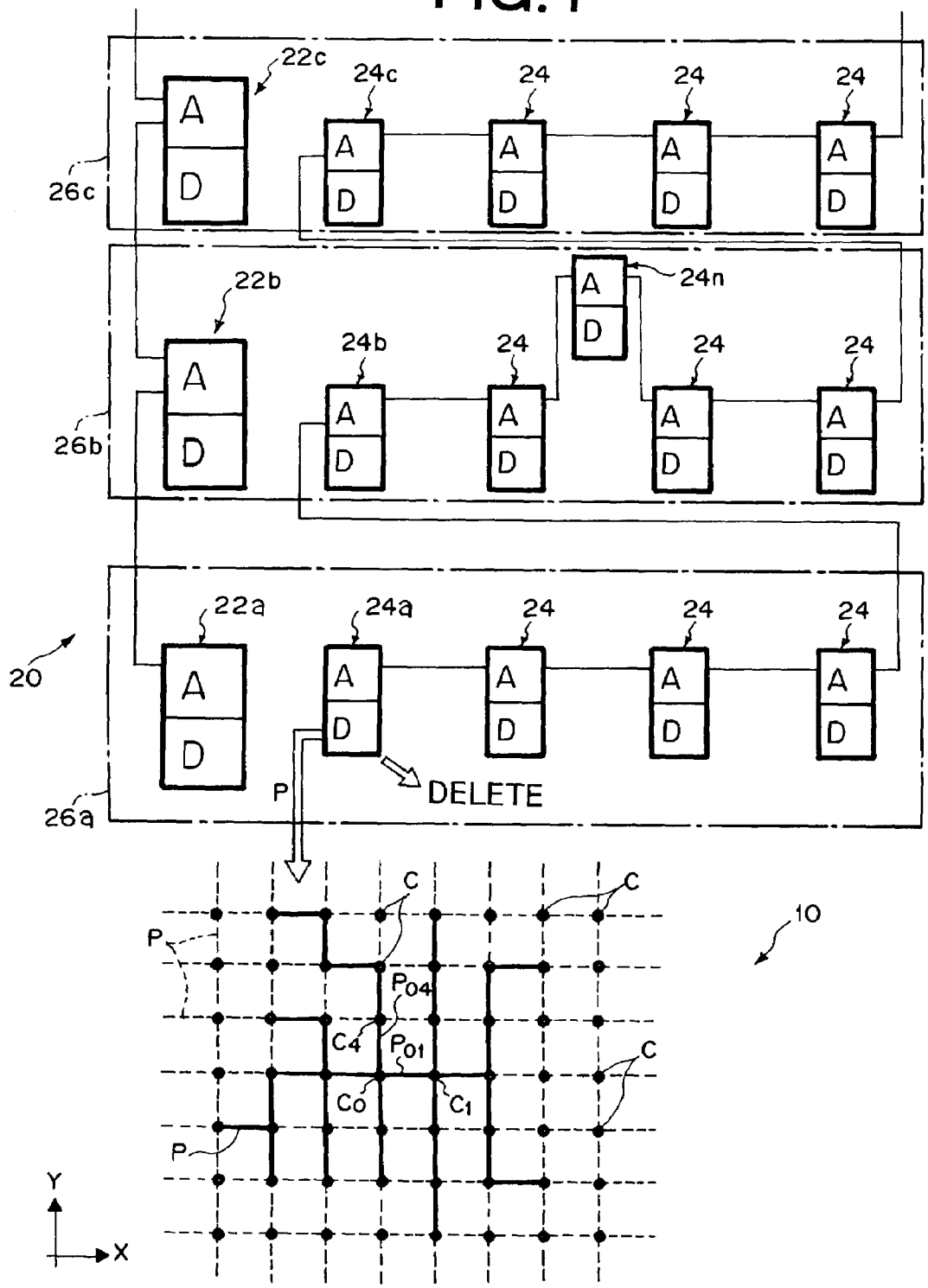
FIG. 1 is a schematic view for explaining the phase unwrapping method for fringe image analysis in accordance with an embodiment of the present invention.

In the following, an embodiment in accordance with the present invention will be explained.

First, in a fringe image analysis method employing the phase unwrapping method for fringe image analysis in accordance with this embodiment, steps for determining a wrapped phase distribution will be explained in brief.

This fringe image analysis method uses a Fizeau type reflection laser interferometer. First, with respect to a surface (sample surface) of a sample such as a lens, which is an optical reflector, to be inspected, a fringe image carrying wavefront information such as surface form distribution of the sample surface is captured while carrying out 4-step fringe scanning.

By this fringe scanning, four interference fringe intensities $I_1$, $I_2$, $I_3$, $I_4$ are determined. The respective interference fringe intensities $I_1$, $I_2$, $I_3$, $I_4$ in the four fringe scans are expressed by the following expressions (1), (2), (3), and (4):

$$I_1(x,y)=I_0(x,y)\{1+\gamma(x,y)\cos[\Phi(x,y)]\} \quad (1)$$

$$I_2(x,y)=I_0(x,y)\{1+\gamma(x,y)\cos[\Phi(x,y)+\pi/2]\} \quad (2)$$

$$I_3(x,y)=I_0(x,y)\{1+\gamma(x,y)\cos[\Phi(x,y)+\pi]\} \quad (3)$$

$$I_4(x,y)=I_0(x,y)\{1+\gamma(x,y)\cos[\Phi(x,y)+3\pi/2]\} \quad (4)$$

where x and y are coordinates on a predetermined coordinate system expanding captured fringe images, e.g., discrete coordinates representing the position of each pixel on a coordinate system set so as to correspond to the pixel arrangement of a solid-state imaging device, whereas $\Phi(x, y)$, $I_0(x, y)$, and $\gamma(x, y)$ are the phase, average optical intensity, and modulation of interference fringe in each pair of coordinates (each pixel), respectively. The modulation substantially has a correlation to interference fringe amplitude, and is specifically represented by the following expression (5):

$$\gamma(x, y) = \frac{2\sqrt{[I_4(x, y) - I_2(x, y)]^2 + [I_1(x, y) - I_3(x, y)]^2}}{I_1(x, y) + I_2(x, y) + I_3(x, y) + I_4(x, y)} \quad (5)$$

From the above-mentioned four expressions (1), (2), (3), and (4), the phase $\Phi(x, y)$ is determined as in the following expression (6):

$$\Phi(x, y) = \tan^{-1}\frac{I_4(x, y) - I_2(x, y)}{I_1(x, y) - I_3(x, y)} \quad (6)$$

Here, as can be seen from the fact that the above-mentioned expression (6) is an arctangent function, the phase $\Phi(x, y)$ is folded in the range from $-\pi$ to $+\pi$. Data in such a state is normally referred to as phase wrapping data. If the denominator is 0 in this expression (i.e., if $I_1(x, y)=I_3(x, y)$), this expression becomes $\pi/2$ and $-\pi/2$ when the numerator is positive and negative, respectively.

For determining a continuous phase distribution $\Phi'(x, y)$ from the phase distribution $\Phi(x, y)$ folded in the range from $-\pi$ to $+\pi$, the phase unwrapping method for fringe image analysis in accordance with this embodiment is employed. In the following, the method of this embodiment will be explained specifically with reference to the drawings.

Figure 2:
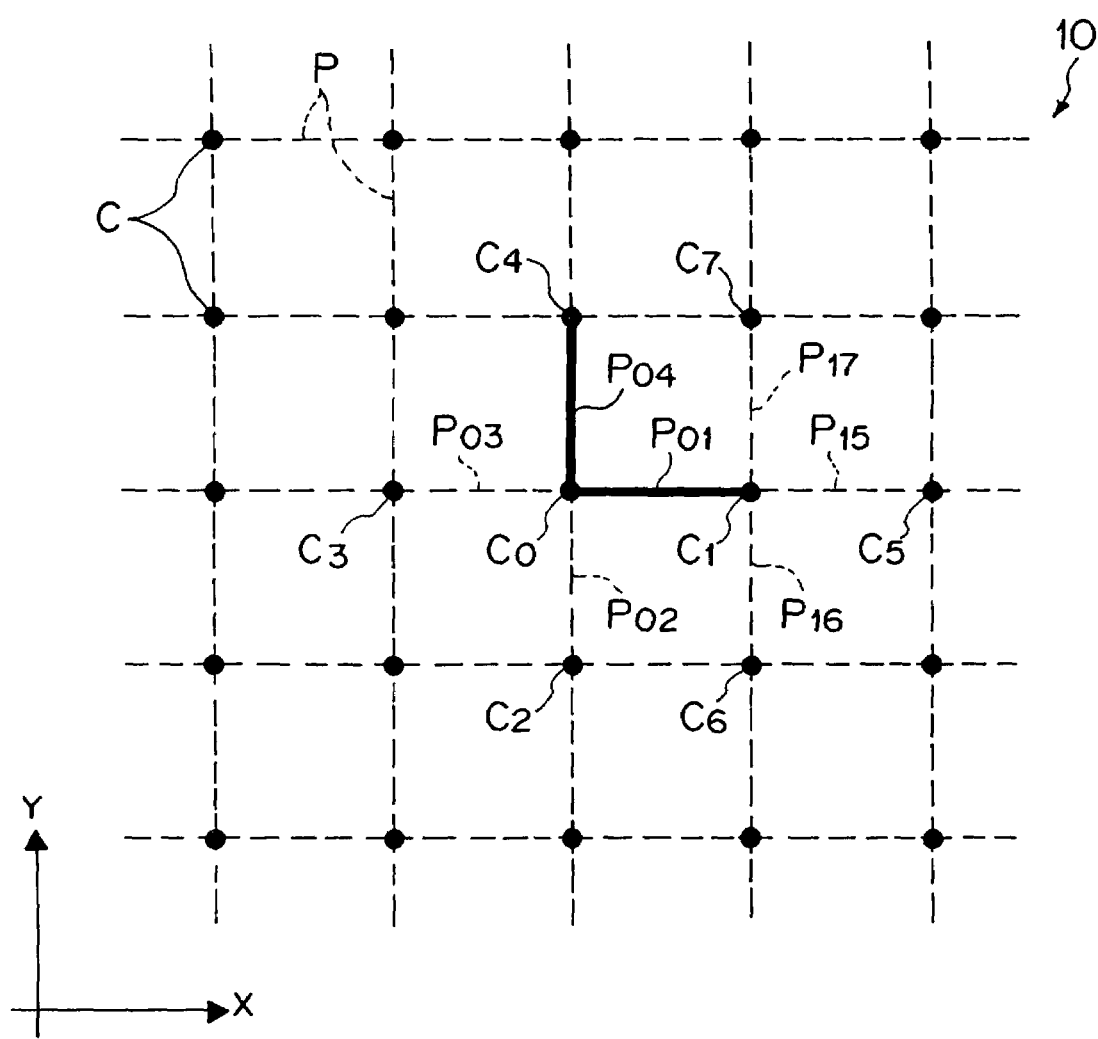
FIG. 2 is a schematic view showing the coordinate system of FIG. 1 under magnification.

FIG. 1 is a schematic view for explaining the phase unwrapping method for fringe image analysis in accordance with this embodiment, schematically illustrating a coordinate system 10 indicating an arrangement of individual pixels in a solid-state imaging device, and a storage list 20 on a memory for storing numeric data and the like. FIG. 2 is a schematic view showing the coordinate system 10 of FIG. 1 under magnification. In the coordinate system 10 of FIGS. 1 and 2, the individual pixels are indicated by black points, paths connecting pixels to each other are indicated by broken lines, and paths chosen as unwrapping paths are indicated by solid lines.

In the storage list 20 shown in FIG. 1, parent lists 22 (used when collectively referring to 22a, 22b, 22c, and the like as in the following) having respective ranks adjacent each other, and child lists 24 (used when collectively referring to 24a, 24b, 24c, 24n and the like as in the following) having respective ranks adjacent each other are connected to each other by solid lines.

First, as shown in FIG. 2, the pixel $C_0$ (m, n) yielding the maximum modulation, for example, is chosen as a start point of an unwrapping path on a coordinate system according to the modulation obtained by the above-mentioned expression (5). Subsequently, respective modulation products $M_{01}$, $M_{02}$, $M_{03}$, $M_{04}$ corresponding to paths $P_{01}$, $P_{02}$, $P_{03}$, $P_{04}$ connecting the pixel $C_0$ to its adjacent four pixels $C_1(m+1, n)$, $C_2(m, n-1)$, $C_3(m-1, n)$, $C_4(m, n+1)$ are calculated. Each modulation product is obtained by multiplying respective modulations of two pixels positioned at both ends of a path. For example, the modulation product $M_{01}$ corresponding to the above-mentioned path $P_{01}$ is calculated by multiplying the modulation $\gamma(m, n)$ of the pixel $C_0$ and the modulation $\gamma(m+1, n)$ of the pixel $C_1$, i.e., $M_{01}=\gamma(m,n)\times\gamma(m+1,n)$.

Figure 3A:
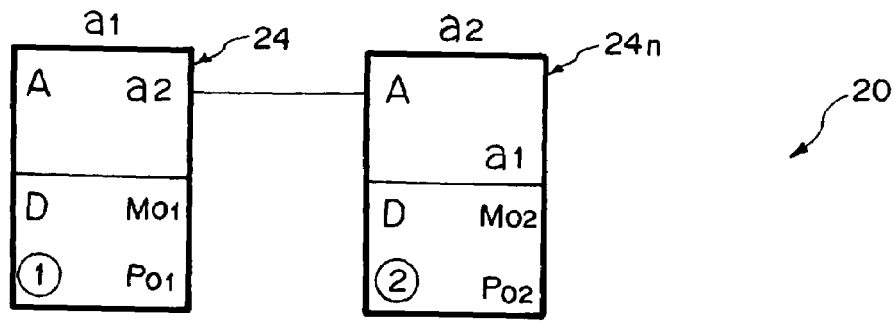
FIGS. 3A to 3C are schematic views for explaining a procedure of storing numeric data into the storage list shown in FIG. 1.
Figure 3B:
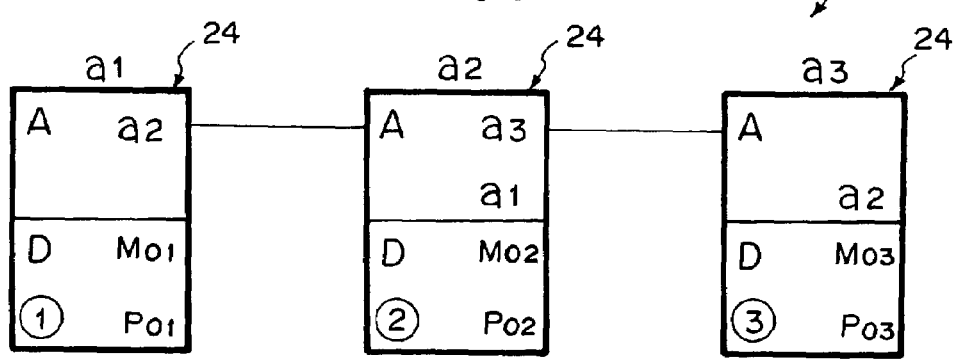
Figure 3C:
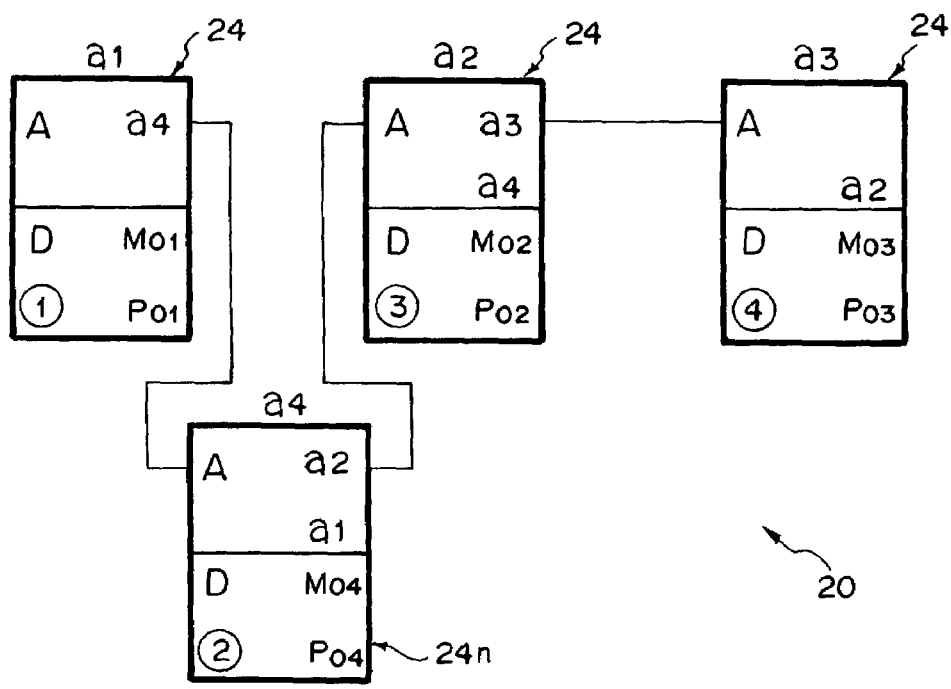

Then, numeric data of thus calculated modulation products $M_{01}$, $M_{02}$, $M_{03}$, $M_{04}$ are ranked in the order of their decreasing magnitude and stored into the storage list 20 on the memory. The storage of numeric data are carried out according to the following procedure, for example. FIGS. 3A to 3C are schematic views for explaining the procedure of storing numeric data.

Though a plurality of parent lists 22 and child lists 24 are provided in the storage list 20 as shown in FIG. 1, only the child lists 24 are shown in FIGS. 3A to 3C for convenience of explanation. Each child list 24 is constituted by an address section A and a data section D in which numeric data are fed. In the child list 24, addresses (indicated by $a_1$, $a_2$, etc.) of child lists 24 at respective ranks immediately thereabove and thereunder, and the like are put into the address section A, whereas its modulation product M, corresponding path P, rank (No. 1, 2, etc.) within the storage list 20, and the like are put into the data section D.

As shown in FIG. 3A, not only the above-mentioned modulation product $M_{01}$ and its corresponding path $P_{01}$, but also data indicative of rank No. 1 is stored into the data section D of the child list 24 having an address $a_1$. Subsequently, the magnitude of modulation product $M_{02}$ is compared with that of modulation product $M_{01}$, and data of the modulation product $M_{02}$ and its corresponding path $P_{02}$ are stored into the data section D of a new child list 24n having an address $a_2$ (assuming that $M_{01} > M_{02}$). Into the data section D and address section A of the child list 24n, data indicative of rank No. 2 and the address $a_1$ of the child list 24 at the rank immediately thereabove are stored, respectively. Into the address section A of the child list 24 at the rank immediately thereabove, the address $a_2$ of the child list 24n at the rank immediately thereunder is stored.

Subsequently, as shown in FIG. 3B, the magnitude of modulation product $M_{03}$ is successively compared with those of modulations $MO_1$ and $M_{02}$, and data of the modulation product $M_{03}$ and its corresponding path $P_{03}$ are stored into the data section D of a new child list 24n having an address $a_3$ (assuming that $MO_1 > M_{02} > M_{03}$). Into the data section D and address section A of the child list 24n, data indicative of rank No. 3 and the address $a_2$ of the child list 24 at the rank immediately thereabove are stored, respectively. Into the address section A of the child list 24 at the rank immediately thereabove, the address $a_3$ of the child list 24 at the rank immediately thereunder is stored.

Further, as shown in FIG. 3C, the magnitude of modulation product $M_{04}$ is successively compared with those of modulations $M_{01}$, $M_{02}$, and $M_{03}$, and data of the modulation product $M_{04}$ and its corresponding path $P_{04}$ are stored into the data section D of a new child list 24n having an address $a_4$ (assuming that $M_{01} > M_{04} > M_{02} > M_{03}$). Also, in the child list 24n, data indicative of rank No. 2 is stored into the data section D, whereas the address $a_2$ of the child list 24 at the rank immediately thereunder and the address $a_1$ of the child list 24 at the rank immediately thereabove are stored into the address section A. Into the address section A of the child list 24 having the address $a_1$, the address $a_4$ of the child list 24 at the rank immediately thereunder changed from $a_2$ is stored. Into the address section A of the child list 24 having the address $a_2$, the address $a_4$ of the child list 24 at the rank immediately thereabove changed from $a_1$ is stored. Respective rank data of child lists 24 having addresses $a_2$ and $a_3$ are lowered by one rank each and then are stored into their corresponding data sections D.

After the numeric data are stored into the storage list 20 as mentioned above, the path $P_{01}$ corresponding to the modulation product $M_{01}$ stored in the data section D in the child list 24 having the address $a_1$, which attains the highest rank within the storage list 20, is chosen as an unwrapping path. As shown in FIG. 1, after this choosing operation, all the data stored in the child lists 24 having the address $a_1$ are deleted from within the storage list 20, and the address data at the ranks immediately thereabove and thereunder in the respective address sections A within the individual lists at rank No. 2 and thereunder and rank data stored in their data sections D are updated.

Subsequently, as shown in FIG. 2, respective modulation products $M_{15}$, $M_{16}$, $M_{17}$ corresponding to individual paths $P_{15}$, $P_{16}$, $P_{17}$ connecting a pixel $C_1$, which is linked to the start point pixel $C_0$ by the path $P_{01}$, to three pixels $C_5(m+2, n)$, $C_6(m+1, n-1)$, and $C_7(m+1, n+1)$ adjacent thereto are calculated. Then, as in the above-mentioned procedure, thus calculated individual numeric data are ranked in the order of their decreasing magnitude and stored into their corresponding child lists 24 within the storage list 20.

After the storage, if rank No. 1 is attained by the child list 24 having the address $a_4$, the path $P_{04}$ corresponding to the modulation product $M_{04}$ stored in the data section D thereof is chosen as the next unwrapping path. After this choosing operation, all the data stored in the child lists 24 having the address $a_4$ are deleted from within the storage list 20, and the address data of ranks immediately thereabove and thereunder stored in the respective address sections A within the individual lists at rank No. 2 and thereunder and rank data stored in their data sections D are updated.

Though the storing of numeric data and choosing of unwrapping paths are basically carried out as the foregoing procedure is repeated, only the data comparing process among the child lists 24 is explained in the above. In practice, the storing of numeric data is carried out in the following procedure in combination with the procedure for storing rank blocks 26 (used when collectively referring to 26a, 26b, 26c, and the like as in the following).

Namely, as shown in FIG. 1, the storage list 20 is divided into blocks for respective predetermined rank ranges (four ranks each in FIG. 1), whereby parent lists 22a, 22b, 22c are provided within respective rank blocks 26a, 26b, 26c. The respective addresses of the child lists 24a, 24b, 24c at the highest ranks within the rank blocks 26a, 26b, 26c and the addresses of parent lists 22 of the rank blocks 26 at ranks immediately thereabove and thereunder are stored in the address sections A of the parent lists 22a, 22b, 22c, whereas the numeric data identical to the respective modulation products M stored in the data sections D of the child lists 24a, 24b, 24c at the highest ranks within the rank blocks 26a, 26b, 26c are stored in the data sections D of the parent lists 22a, 22b, 22c.

Though omitted in the above-mentioned explanation and drawings, each child list 24 stores in its address section A not only the respective addresses of the child lists at ranks immediately thereabove and thereunder, but also the address of the parent list in the rank block to which it belongs.

First, the newly calculated modulation product M is successively compared in terms of magnitude with the respective modulation products M stored in the parent lists 22a, 22b, 22c within the rank blocks 26a, 26b, 26c, whereby the rank block 26b to store the newly calculated modulation product M is chosen (FIG. 1 shows the case where the newly calculated modulation product M is smaller than each of the respective modulation products M stored in the parent lists 22a, 22b but greater than the modulation product M stored in the parent list 22c). Subsequently, according to the above-mentioned procedure, the new modulation product M is compared in terms of magnitude with each of the respective modulation products M stored in the child lists 24 within the chosen rank block 26b, whereby the rank position at which the new modulation product M is to be stored within the rank block 26b is determined. After the rank position is determined, data of the new modulation product M and data of its corresponding path P are stored into the data section D of a new child list 24n. Along with the addition of the new child list 24n, the address data and rank data within each child list 24 are updated. Further, the block formation is updated, i.e., the child list 24 at the lowest rank within the rank block 26b to which the new child list 24n is added is descended to the top within the next rank block 26c, whereas the child list 24 at the lowest rank within the rank block 26c is descended to the top within the next rank block (not depicted). Here, the numeric data and address data stored in the parent list 22c of the rank block 26c are also updated to data corresponding to the child list 24 descended from the rank block 26b.

After the new numeric data is stored into the storage list 20 as mentioned above, the path P corresponding to the modulation product M stored in the data section D within the child list 24a attaining rank No. 1 within the storage list 20 is chosen as an unwrapping path. After the choosing, all the data stored within the child list 24a are deleted from within the storage list 20, and the respective address data at ranks immediately thereabove and thereunder stored in the respective address sections A within the child lists 24 at rank No. 2 and thereunder and the rank data stored in the data sections D thereof are updated. Further, as mentioned above, the block formation is updated.

As the foregoing procedure is repeated, unwrapping paths are successively chosen, and predetermined phase unwrapping calculations are carried out along thus chosen unwrapping paths, whereby a continuous phase distribution Φ'(x, y) is determined.

As mentioned above, when storing the newly calculated modulation product M into the storage list 20, the new modulation product M is initially compared in terms of magnitude with each of the respective modulation products M stored in the parent lists 22 of the individual rank blocks 26, so as to choose the rank block 26 to store the new modulation product M. Subsequently, it is compared in terms of magnitude with each of the respective modulation products M stored in the child lists 24 within thus chosen rank block 26, so as to determine the rank. Therefore, even when the number of modulation products increases, the time required for storage can be shortened, whereby unwrapping paths can be chosen rapidly.

Though the number of child lists 24 is 4 within each rank block 26 in the above-mentioned embodiment, favorable numbers (e.g., 256) may be chosen according to the number of pixels.

Though each child list is assumed to have its own rank data in the above-mentioned embodiment, the rank will be defined if it is determined in which order the individual lists are linked to each other, i.e., if the child list has the respective address data of child lists at the ranks immediately thereabove and thereunder. Therefore, a mode having no data for ranks in particular can be employed as well.

Though each child list is assumed to have data of a path corresponding to its modulation product in the above-mentioned embodiment, it may have coordinate data of two pixels positioned at both ends of a path instead of data of the path itself.

As the representative rank within each rank block, one yielding the largest modulation product in the rank block is used in the above-mentioned embodiment. However, one yielding the smallest modulation product can also be used in place thereof.

Also, according to the number of pixels, the structure of storage list can be divided into a greater number of hierarchies (e.g., parent list, child list, and grandchild list) as appropriate.

Though all the data of calculated individual modulation products are stored into the storage list in the above-mentioned embodiment, a numeric range of modulation product suitable for an unwrapping path may be set beforehand, and data of modulation products outside this range may be kept from being stored into the storage list. This can reduce the number of comparisons of numeric data.

Though the above-mentioned procedure is executed in substantially all the regions on a coordinate system in the above-mentioned embodiment, it may be used only in a region yielding a greater amount of noise in a wrapped phase distribution whereas unwrapping paths are defined simply in the order of pixel arrangement in other regions yielding a smaller amount of noise, and so forth, whereby unwrapping paths may be determined by a simpler procedure.

Though modulation products are used as numeric data acting as an index for choosing unwrapping paths in the above-mentioned embodiment, the magnitude of phase gradient between each pair of pixels may be used instead, so that unwrapping paths may be chosen in the order of increasing phase gradient.

The method of the present invention can also be carried out by using 3- or higher-step techniques such as 5-step technique instead of the 4-step technique mentioned above.

Though the above-mentioned embodiment is employed for measuring the surface form (form of irregularities and steps) in the case where the sample is an optical reflector, the method of the present invention can also be used for measuring the thickness deviation, refractive index distribution, and the like of a sample when it is a light-transmitting article.

Without being restricted to the fringe analysis method using the above-mentioned Fizeau type reflection laser interferometer, the method of the present invention is also applicable to fringe analysis methods using various other interferometers.

Further, the kind of fringe information is not limited to the above-mentioned interference fringe information, but moiré fringe information and the like can also be subjected to the present invention.

Without being restricted to the case where the phase distribution Φ'(x, y) is obtained according to a plurality of fringe information items obtained by fringe scanning, the method of the present invention is also applicable to the case where the phase distribution Φ'(x, y) is obtained according to the fringe information obtained by a single capturing operation.

When storing newly calculated numeric data into a storage list in the phase unwrapping method for fringe image analysis of the present invention, as explained in the foregoing, the new numeric data is initially compared with the numeric data of the representative rank within each rank block in terms of magnitude, whereby the rank block to store the data is chosen. Subsequently, the data is compared in terms of magnitude with each of respective numeric data within thus chosen rank block, so as to determine its rank, and then is stored into the storage list. Therefore, even when the number of pixels of an imaging device increases so that the number of numeric data to be stored becomes greater, the time required for storing can be restrained from increasing greatly, whereby unwrapping paths can rapidly be chosen.

Therefore, phase unwrapping can be carried out rapidly, whereby the phase state can stably be analyzed at a high speed.

What is claimed is:

1. A phase unwrapping method for fringe image analysis in which a wrapped phase distribution concerning a sample obtained on a predetermined coordinate system according to fringe image data carrying wavefront information of said sample is subjected to unwrapping along a predetermined unwrapping path chosen on said coordinate system, so as to obtain an unwrapped phase distribution, said method comprising:

a first step of ranking and storing as a scale for choosing the unwrapping path in a predetermined storage list from an upper rank to a lower rank in the order of size suitable for path selection a predetermined number of numeric data successively calculated so as to respectively correspond to individual paths connecting predetermined pixels adjacent each other on said coordinate system; and a second step of taking out said numeric data at the highest rank in all the numeric data stored in said storage list and choosing the path corresponding to thus taken-out numeric data as a new unwrapping path;

wherein the storage of numeric data in said first step comprises a block choosing step of choosing a rank block to store said new numeric data by comparing in terms of magnitude new numeric data to be stored in said storage list with the numeric data at a predetermined representative rank in each of rank blocks for each predetermined rank range in said storage list, and a rank position choosing step of comparing in terms of magnitude said new numeric data with each numeric data in thus chosen rank block so as to determine a rank position at which said new numeric data is to be stored; and wherein said predetermined rank range is updated together with said storage of numeric data in said first step.

2. A phase unwrapping method for fringe image analysis according to claim 1, wherein said numeric data is a modulation product of said pixels adjacent each other; and wherein said numeric data at the highest rank is the largest of all the modulation products stored.

3. A phase unwrapping method for fringe image analysis according to claim 1, wherein, when said numeric data is calculated in said first step, thus calculated numeric data is stored in said storage list only if said calculated numeric data is a value more suitable for path selection than a predetermined value.

4. A phase unwrapping method for fringe image analysis according to claim 1, wherein said unwrapping is carried out while applying an algorithm including said first and second steps only to a region yielding a large amount of noise in said wrapped phase distribution in said coordinate system.

* * * * *